Figure 19:
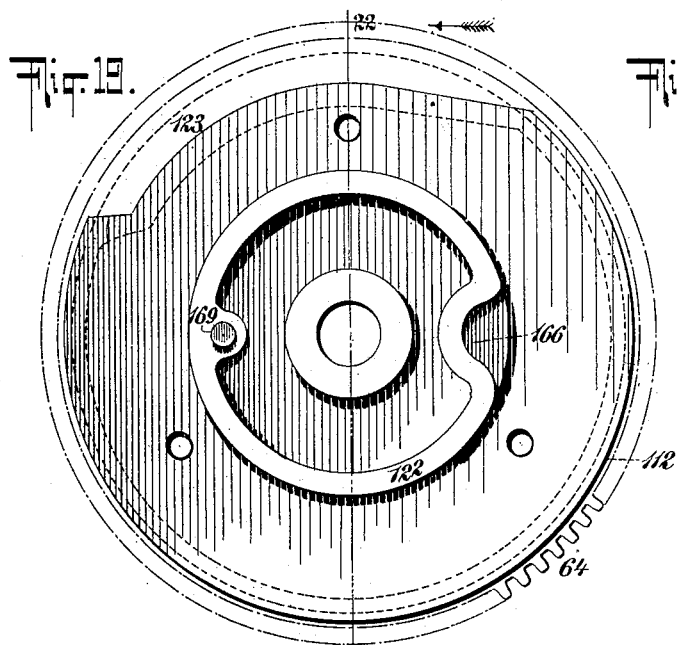

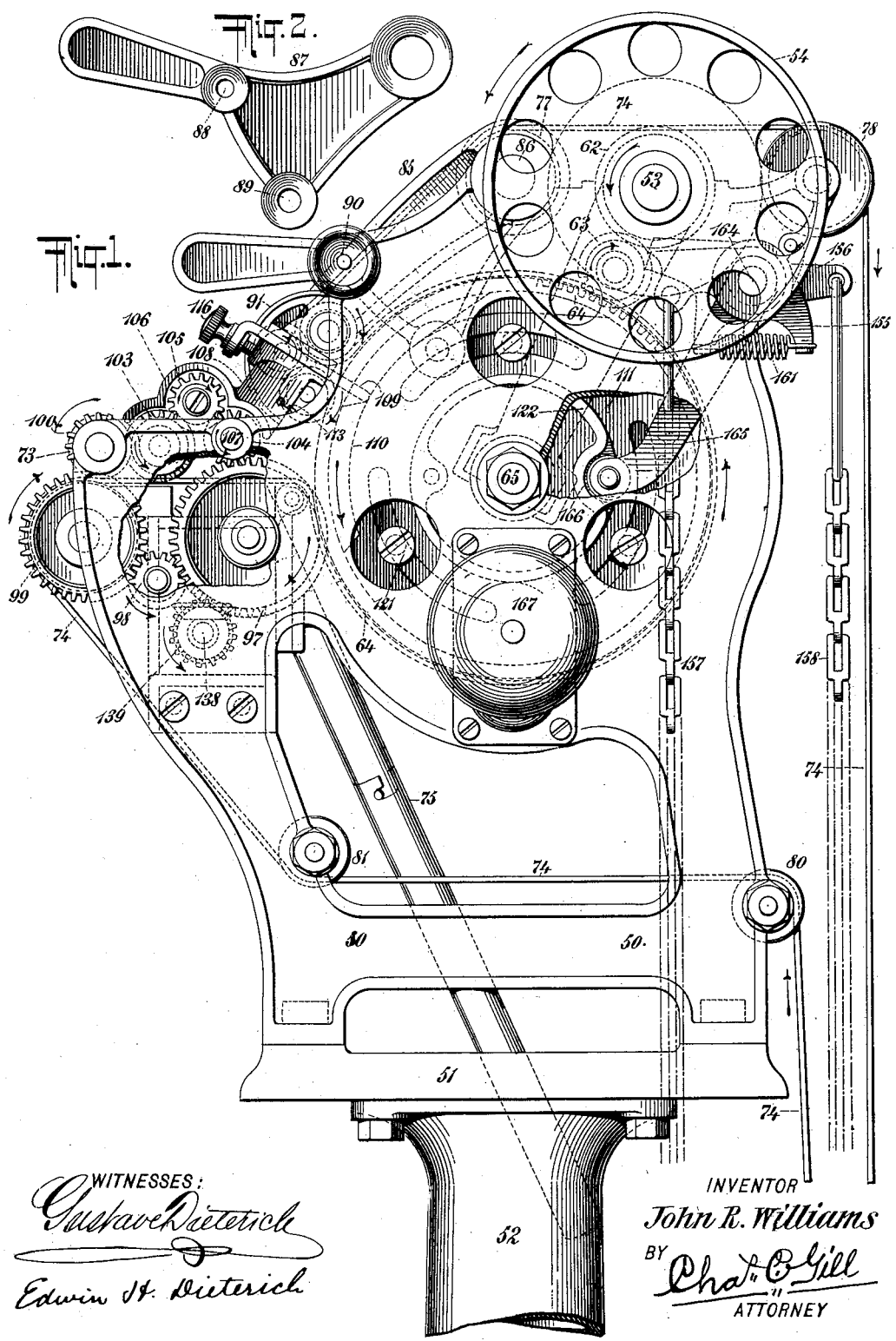

No. 662,212. Patented Nov. 20, 1900.
J. R. WILLIAMS.
TOBACCO STRIPPING AND BOOKING MACHINE.
(Application filed June 4, 1900.)
(No Model.) 11 Sheets—Sheet 2.
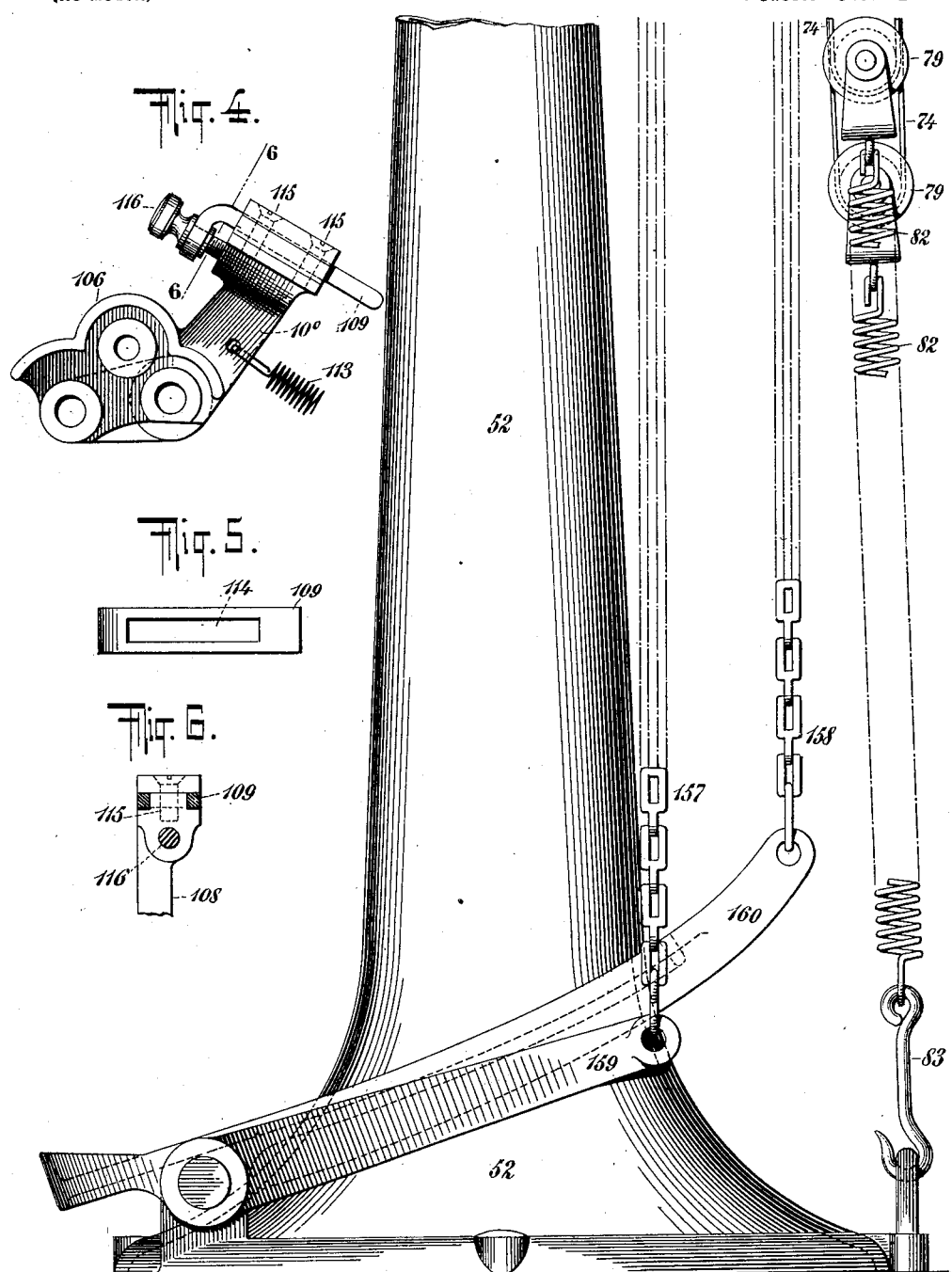
WITNESSES:
Gustave Dieterich
Edwin H. Dieterich
INVENTOR
John R. Williams
BY Chas. C. Gill
ATTORNEY

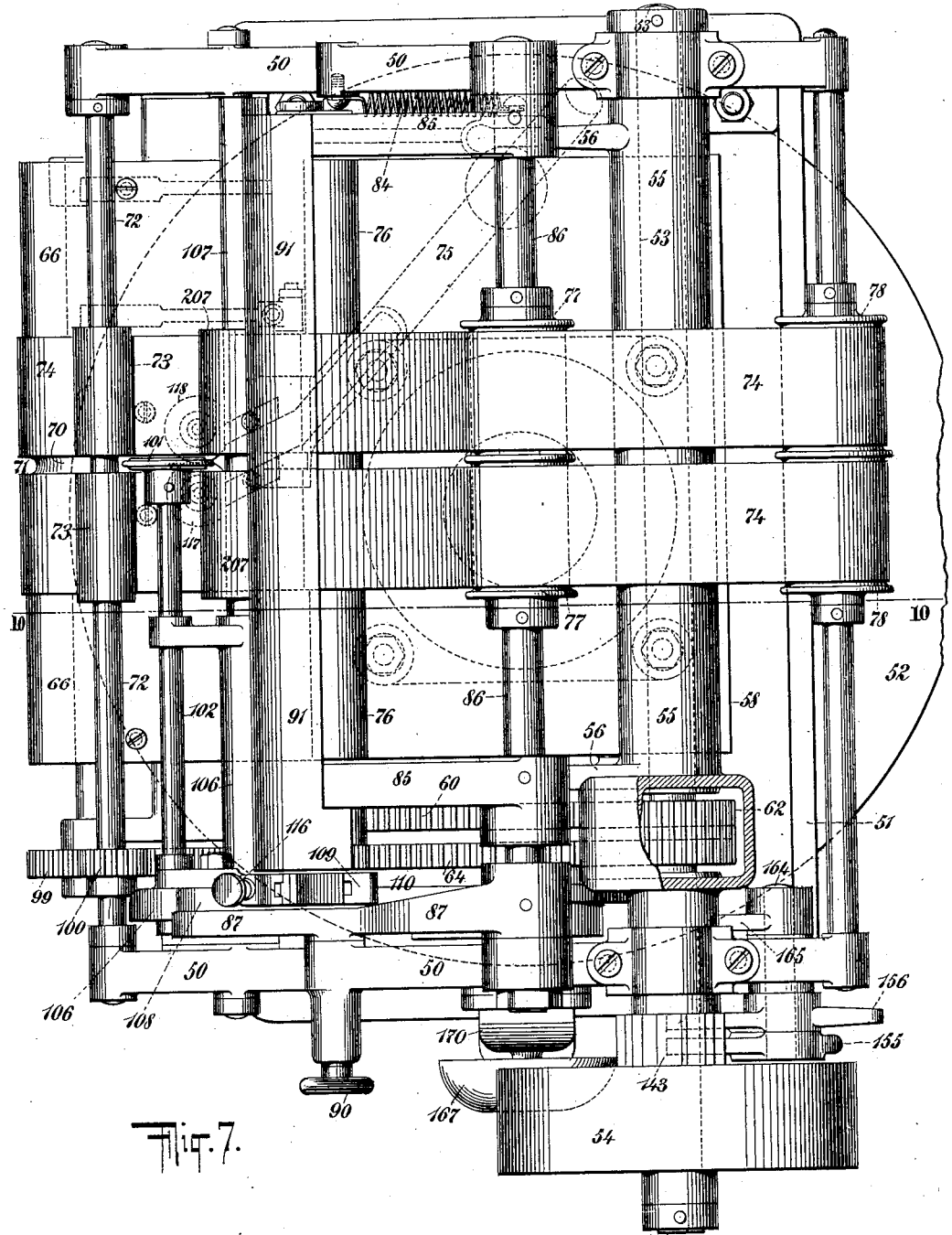

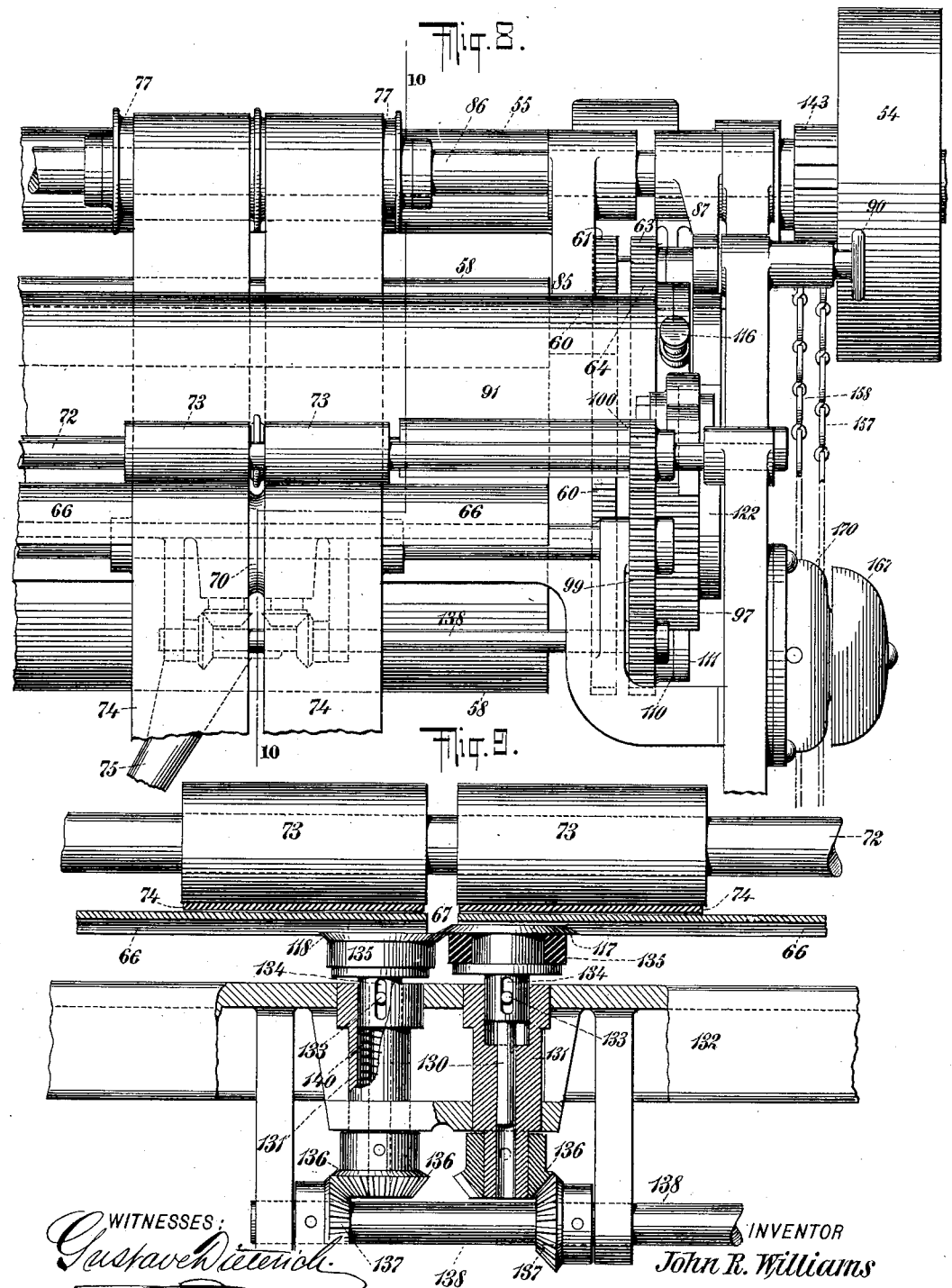

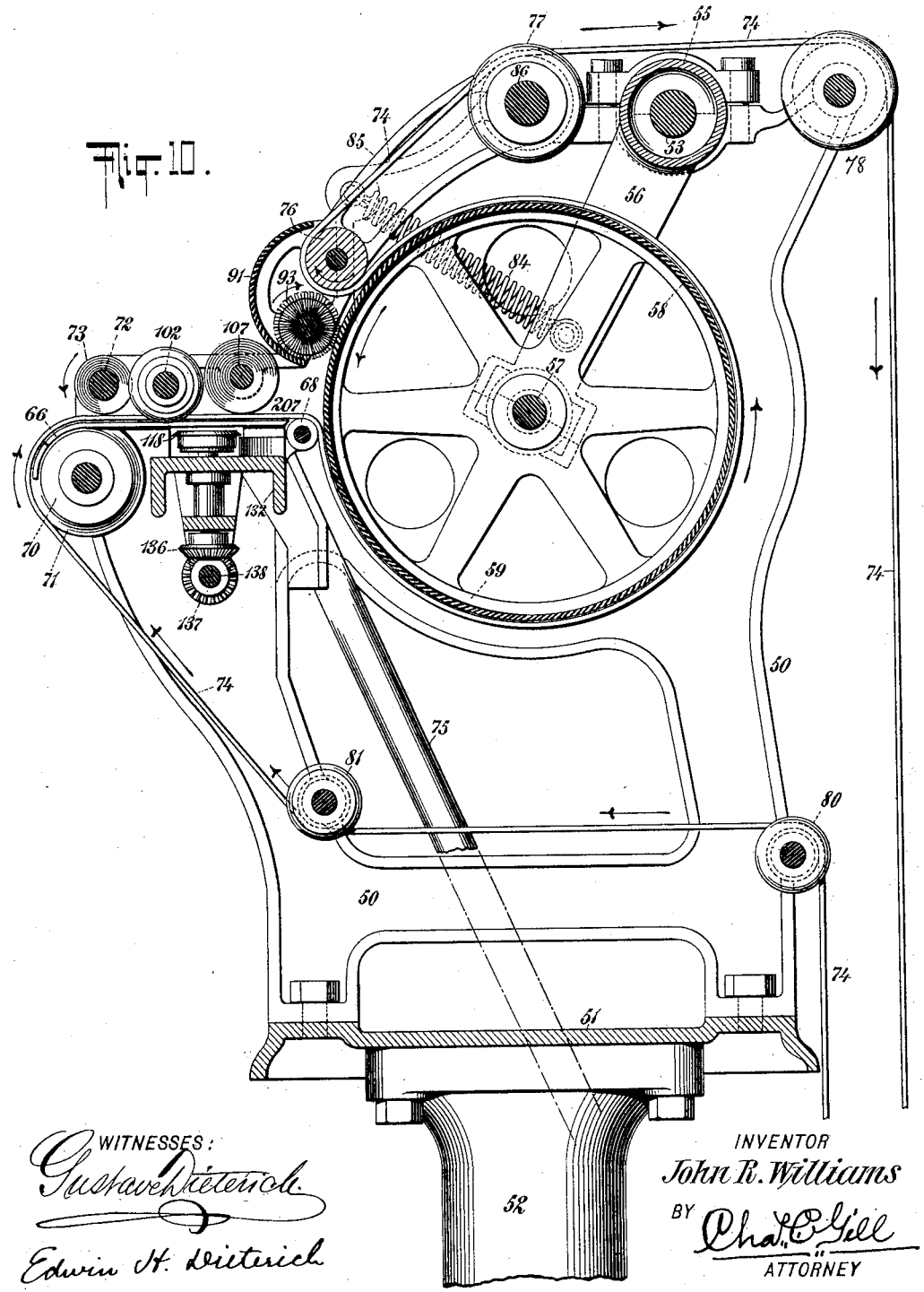

No. 662,212. Patented Nov. 20, 1900.
J. R. WILLIAMS.
TOBACCO STRIPPING AND BOOKING MACHINE.
(Application filed June 4, 1900.)
(No Model.) 11 Sheets—Sheet 6.
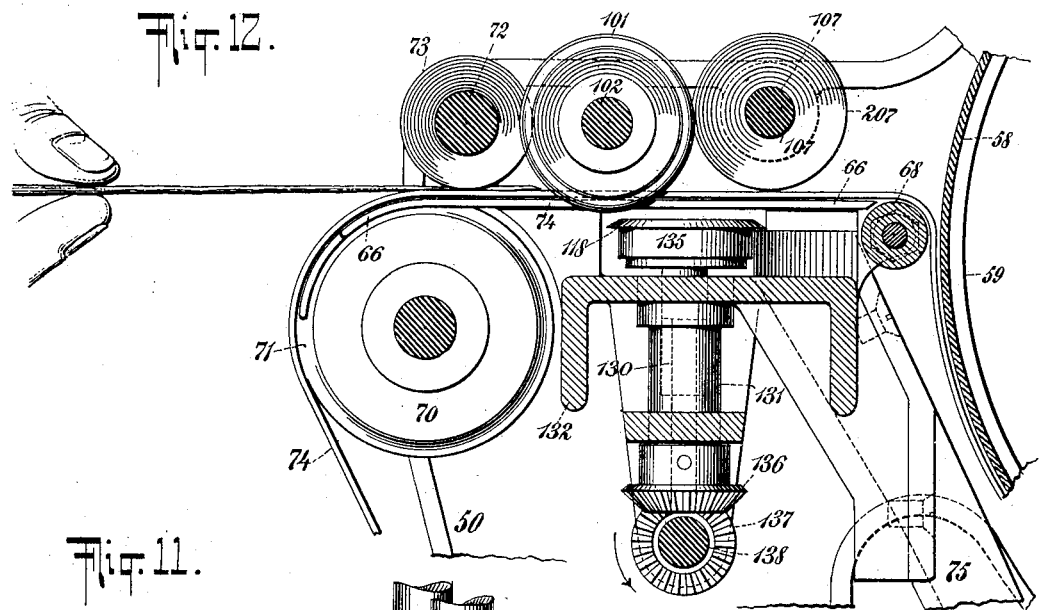
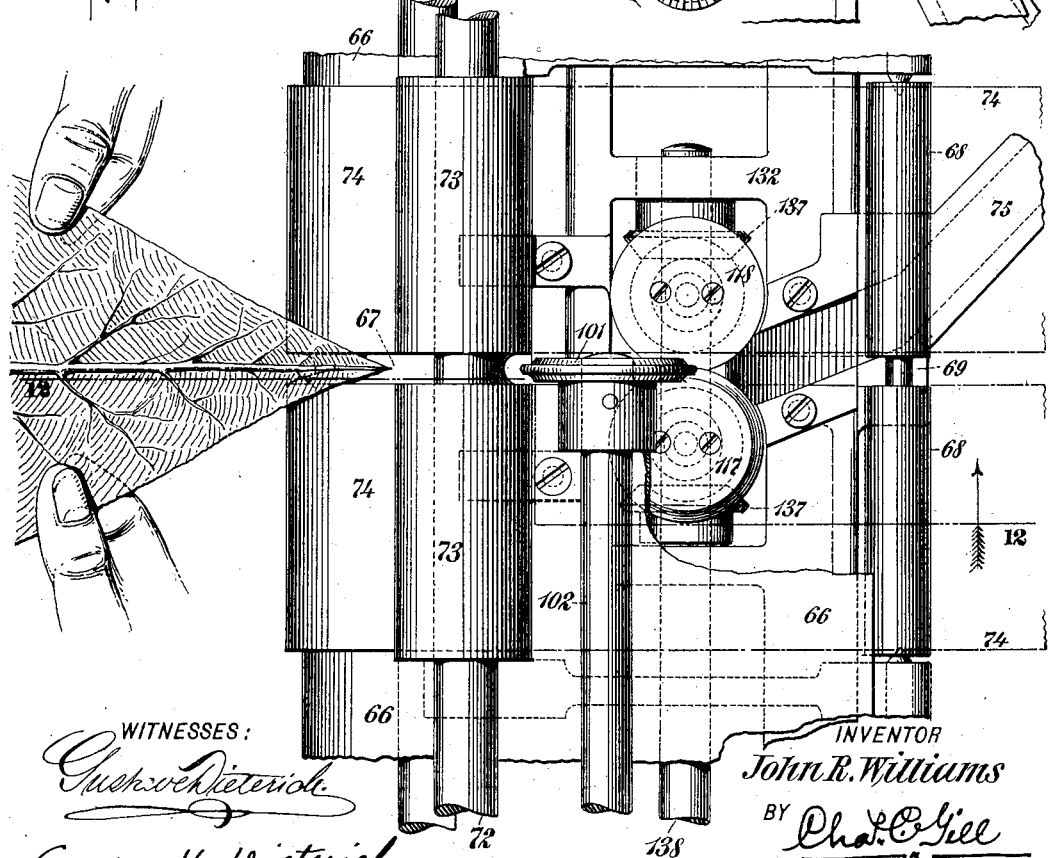
WITNESSES:
Gustav Dieterich
Edwin H. Dieterich
INVENTOR
John R. Williams
BY Chas. C. Gill
ATTORNEY

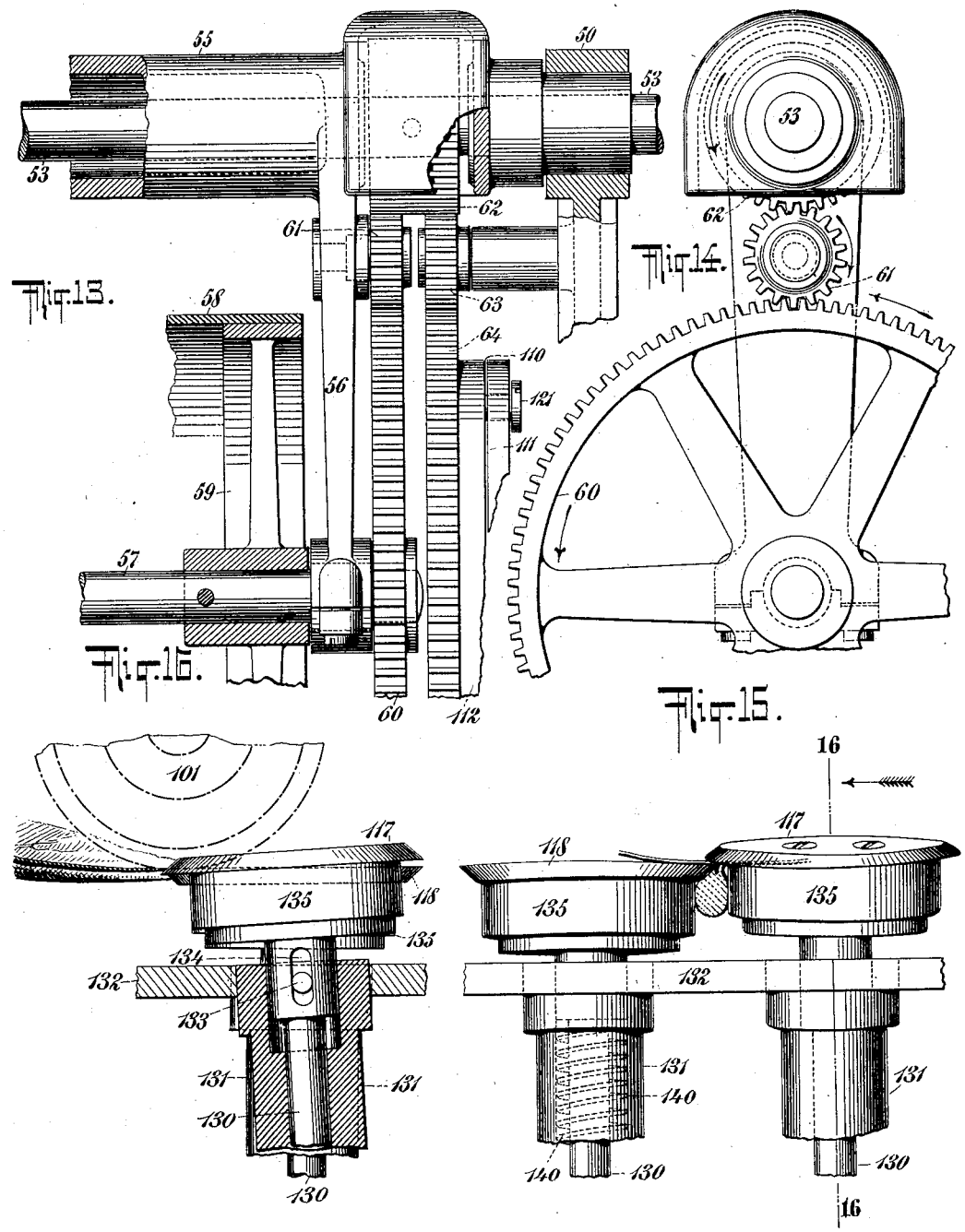

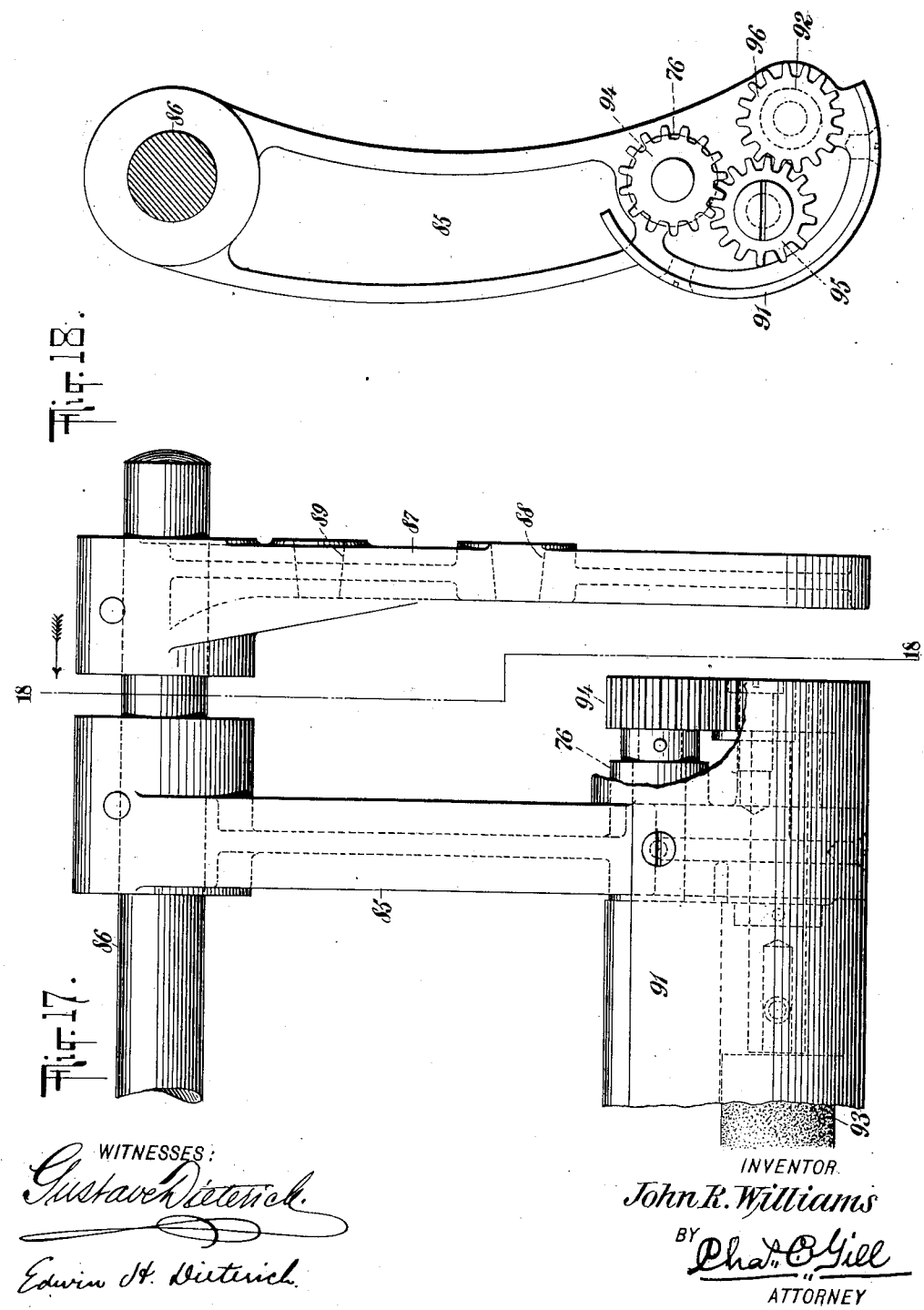

No. 662,212. Patented Nov. 20, 1900.
J. R. WILLIAMS.
TOBACCO STRIPPING AND BOOKING MACHINE.
(Application filed June 4, 1900.)
(No Model.) 11 Sheets—Sheet 9.

WITNESSES:
Gustave Dietrich
Edwin H. Dietrich

INVENTOR
John R. Williams
BY Chas. E. Gill
ATTORNEY

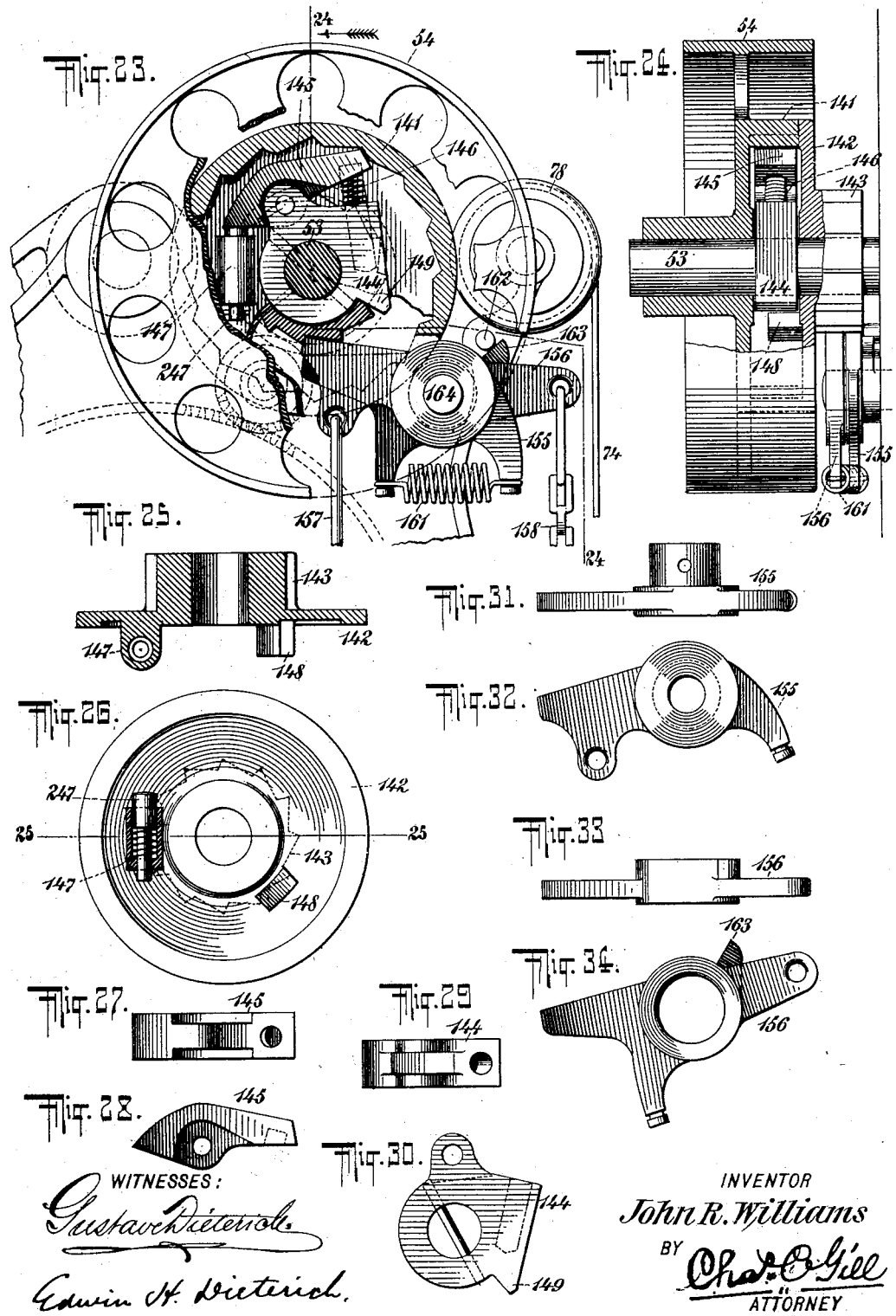

No. 662,212. Patented Nov. 20, 1900.
J. R. WILLIAMS.
TOBACCO STRIPPING AND BOOKING MACHINE.
(Application filed June 4, 1900.)
(No Model.) ii Sheets—Sheet II.

WITNESSES:
Gustave Dieterich
Edwin H. Dieterich

INVENTOR
John R. Williams
BY Chas. C. Gill
ATTORNEY

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y.

TOBACCO STRIPPING AND BOOKING MACHINE.

SPECIFICATION forming part of Letters Patent No. 662,212, dated November 20, 1900.

Application filed June 4, 1900. Serial No. 18,945. (No model.)

*To all whom it may concern:*

Be it known that I, JOHN R. WILLIAMS, a citizen of the United States, and a resident of East Orange, in the county of Essex and State of New Jersey, have invented certain new and useful Improvements in Tobacco Stripping and Booking Machines, of which the following is a specification.

The invention relates to improvements in tobacco stripping and booking machines; and it consists in the novel features, arrangement, and combinations of parts hereinafter described, and particularly pointed out in the claims.

I have embodied my invention in the machine described herein and comprising, among other features, a feed-table, over which the tobacco-leaves are spread out and fed inward; a pair of rotatory cutters arranged slightly below a slot in the said feed-table; a wheel for pressing upon the stem of the leaf during the inward feed of the latter for pressing said stem, or such portion thereof as may be desired, below the edges of said cutters in order that said stem, or such portion thereof as may be desired, may be cut from the leaf during the inward travel of the latter over said feed-table; means for adjusting the degree of pressure the aforesaid wheel shall exert upon the stem of the tobacco-leaf during the inward travel of the latter, and means for booking the leaves or the halves of the leaves after the stems have been removed therefrom, the said booking means comprising, by preference, a cylinder or drum mounted upon a shaft suspended by an oscillatory frame, and endless belts extending over said feed-table to said drum, thence extending around over said drum to a point adjacent to that at which the leaves are fed inward over said table, thence turning in a reverse direction over suitable rollers and passing downward to means for keeping them taut, and thence extending upward to the front edge of said feed-table, the said belts being continuous and one being located at each side of the central slot in the feed-table along which the stem of the leaf is fed.

In addition to the general features of construction above pointed out the said machine embodies many novel details coöperating with the parts above enumerated and hereinafter described.

The invention will be fully understood from the detailed description hereinafter presented, reference being had to the accompanying drawings, in which—

Figure 1 is a side elevation of a stripping and booking machine constructed in accordance with and embodying the invention, a portion of the pedestal-base for the machine being broken away and a portion of the lower part of the feed-belts being omitted. Fig. 2 is a detached side elevation of a detailed portion of the machine and hereinafter specifically referred to. Fig. 3 is a side elevation, corresponding with Fig. 1, of those portions of the pedestal-base and traveling feed-belts which are omitted in Fig. 1. Fig. 4 is an end elevation of the frame connected with a presser-wheel which acts upon the stem of the tobacco-leaf and illustrates in detail the adjustable finger by which the relation of said presser-wheel to the stem of the tobacco-leaf may be regulated at will. Fig. 5 is a detached top view of said finger shown in Fig. 4. Fig. 6 is a sectional view of the means for adjusting the pressure of the presser-wheel, said section being on the dotted line 6 6 of Fig. 4. Fig. 7 is a top view, partly broken away, of the entire machine. Fig. 8 is a front elevation, partly broken away, of a portion of same. Fig. 9 is an enlarged vertical transverse section, partly broken away, through the feed-table and cutter-supports. Fig. 10 is a vertical longitudinal section through the machine on the dotted line 10 10 of Fig. 8. Fig. 11 is a top view of a portion of the machine, the feed plate or table being partly broken away to disclose the knives below the same for removing the tobacco-stems and the belts which carry inward the tobacco-leaf being at the right-hand side of said figure indicated by dotted lines. Fig. 12 is a vertical longitudinal section of same on the dotted line 12 12 of Fig. 11. Fig. 13 is a detached front view, partly broken away and partly in section, of a portion of the upper right-hand side of the machine and illustrates more particularly the means for transmitting power from the main driving-shaft to the booking-cylinder and to the other parts of the machine.

Figure 22:
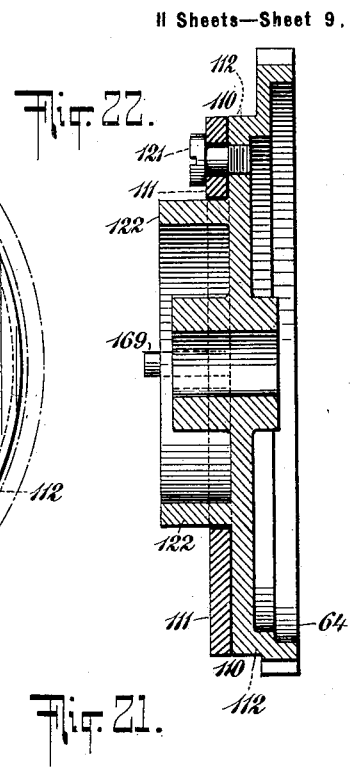
Figure 20:
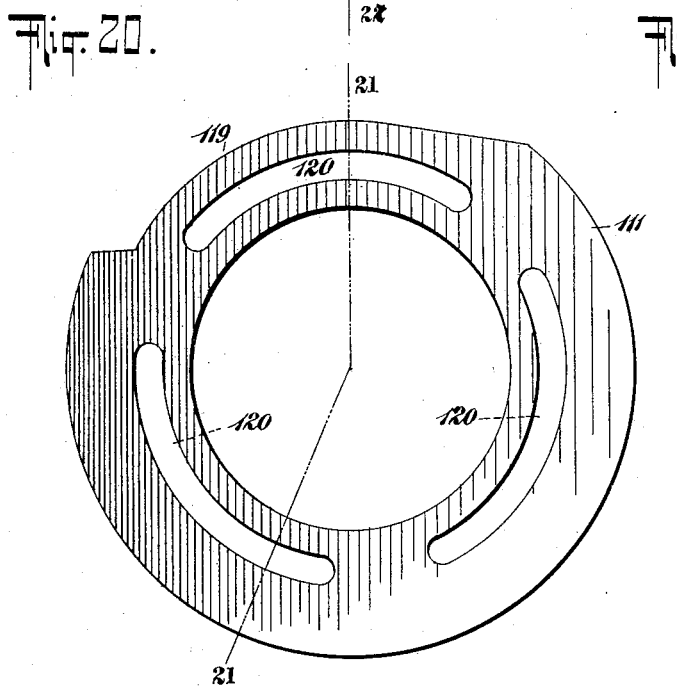
Figure 21:
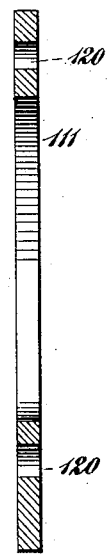
Figure 36:
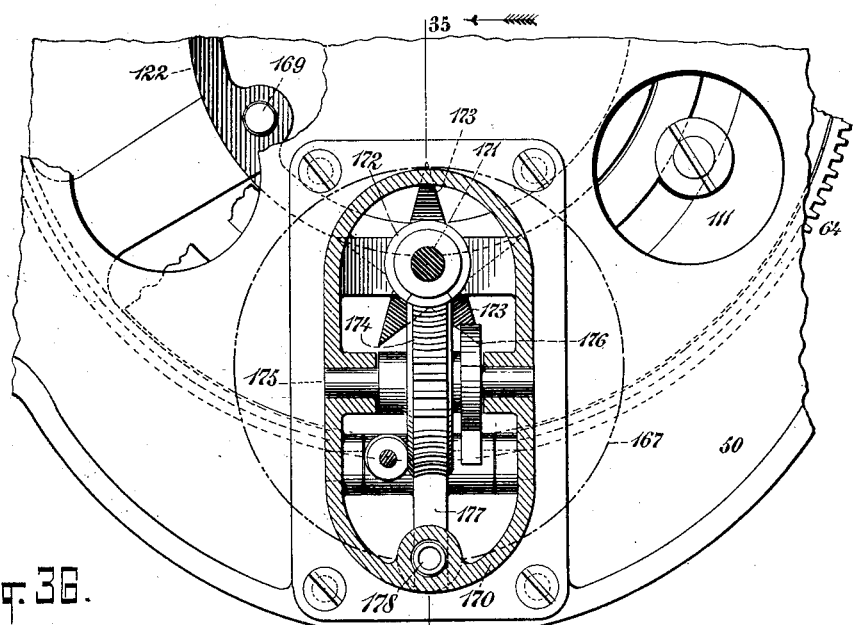
Figure 35:
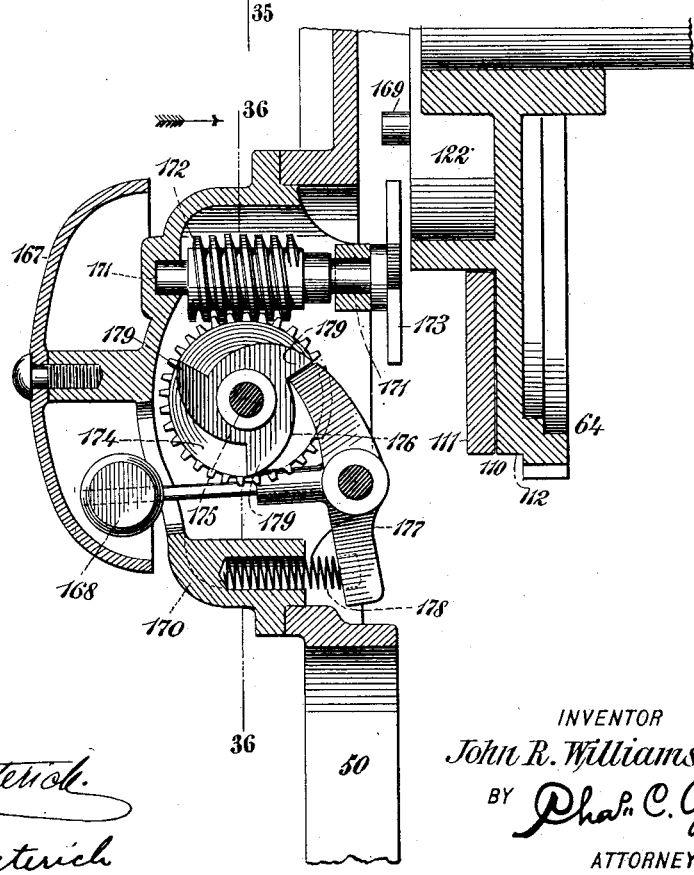

Fig. 14 is an end view of same, the side frame of the machine being omitted and only the gears for transmitting the motion from the main driving-shaft to the booking cylinder or drum being illustrated. Fig. 15 is an enlarged detached side elevation, partly broken away, of the cutting-knives and other parts. Fig. 16 is an end view of same, this figure being partly in section through the socket for the shank of one of said knives and illustrating by dotted lines the presser-roller for pressing the stem of the tobacco-leaf (also shown) downward below the cutting-edges of the said knives, the said section of the said knife-shank socket being on the dotted line 16 16 of Fig. 15. Fig. 17 is an enlarged detached front elevation of the hinged portion of the frame of the machine, said hinged portion being adapted to be moved upward when desired for freeing the tobacco-leaves from the booking-cylinder. Fig. 18 is a vertical section of same on the dotted lines 18 18 of Fig. 17. Fig. 19 is a side elevation of the main gear-wheel, through which power is transmitted to the belt-rollers, feed-rollers, cutting-knives, and presser-roller. Fig. 20 is a detached side elevation of an adjustable cam-section to be applied upon a hub of the gear-wheel shown in Fig. 19 and comprising, together with a portion of said wheel, a cam-wheel for controlling the presser-wheel which acts upon the stem of the tobacco-leaf. Fig. 21 is a sectional view of same on the dotted line 21 21 of Fig. 20. Fig. 22 is a vertical section, on the line 22 22 of Fig. 19, of the wheel shown in Fig. 19 with the cam-section shown in Fig. 20 applied in position thereon and secured to rotate therewith. Fig. 23 is a side elevation, partly broken away and partly in section, of a portion of the machine, this figure illustrating more particularly the details of the clutch mechanism connected with the driving-wheel and main power-shaft. Fig. 24 is a sectional view of same on the dotted line 24 24 of Fig. 23. Figs. 25 to 30, inclusive, are detailed views of the several inner parts of the clutch on the main power-shaft, and said parts are specifically referred to hereinafter. Fig. 31 is a detached top view of the dog which upon each revolution of the booking cylinder or drum engages one part of the clutch mechanism and effects the stoppage of the machine. Fig. 32 is a side elevation of same. Fig. 33 is a top view of a dog shown in Figs. 1 and 23 and which may by a foot-treadle be caused to engage the clutch mechanism and stop the machine at any point during the rotation of the booking cylinder or drum. Fig. 34 is a side elevation of same. Fig. 35 is a vertical transverse section through a portion of the right-hand side of the machine and is intended to illustrate more particularly the means for sounding an alarm when a predetermined number of leaves have been booked upon the booking cylinder or drum, it being customary to remove the stripped leaves from said cylinder or drum every time the said leaves have accumulated thereon to the number of fifty. Fig. 36 is a vertical longitudinal section of same on the dotted line 36 36 of Fig. 35, and Fig. 37 illustrates by dotted line 35 35 the section on which Fig. 35 is taken.

In the drawings, 50 50 denote the main side frames of the machine, said frames being mounted upon a bed-plate 51, which is supported upon a pedestal-base 52, the latter being more fully shown in Fig. 3. The side frames 50 are simply of suitable form and outline to support the operative parts of the machine, and this invention is not limited to any special construction of side frames 50 or pedestal-base 52.

Extending transversely across the top of the side frames 50 is mounted in suitable bearings the main driving-shaft 53, upon the right-hand end of which is provided the belt-wheel 54, by which power may be applied. Adjacent to the belt-wheel 54 there is provided upon the right-hand end of the driving-shaft 53 suitable clutch mechanism, hereinafter described, by which the said shaft is caused to automatically stop at the end of each revolution of the booking cylinder or drum, the said clutch mechanism being illustrated in detail in Figs. 23 to 30, inclusive.

Encompassing the driving-shaft 53 and extending between the side frames 50 is a tubular cast casing 55, having at its ends adjacent to said side frames 50 the downwardly-extending arms 56, in the lower ends of which is mounted the shaft 57, carrying the booking cylinder or drum 58, the latter being a hollow shell supported at its ends upon the rims 59, secured to said shaft 57. The casing 55, having the arms 56 supporting the drum-shaft 57 and drum 58, is free to have a limited axial motion within its bearings in the side frames 50, so as to allow the drum 58 to have a limited swinging or, with the arms 56, oscillatory motion. The right-hand end of the drum-shaft 57 has secured upon it the gear-wheel 60, (shown in Figs. 7, 8, and 13,) and this gear-wheel 60 is in mesh with the pinion-wheel 61, mounted upon a stud carried by the right-hand arm 56, as shown in Fig. 13, and in engagement with the broad gear-wheel 62, rigidly secured upon the main driving-shaft 53. The drum or cylinder 58 receives its rotary motion from the main driving-shaft 53 through the gear-wheel 62, pinion 61, and gear-wheel 60, the latter being secured on the drum-shaft 57. In view of the fact that the gear-wheel 60 and pinion 61 may swing with the drum-shaft 57 and drum 58, the said drum may have a limited backward-and-forward-swinging movement without interrupting the movement of the gear-wheels 62, 61, and 60, and consequently without interrupting its own rotation. The booking drum or cylinder 58 stops at the end of each revolution, as hereinbefore referred to. The gear-wheel 62 simultaneously with the rotation of the cylinder or drum 58 imparts through the pinion-wheel 63 and gear-wheel 64 (see Fig.

13) the requisite motion to the other parts of the machine, as will be hereinafter explained, it being necessary at this place simply to say that the gear-wheel 64 is entirely independent of the gear-wheel 60 and mounted upon a short shaft or stud 65, secured in the right-hand side frame 50 of the machine, said gear-wheel 64 being indicated by dotted lines in Fig. 1, which is an elevation of the right-hand side of the machine. Between the front portions of the said frames 50 of the machine is secured the horizontal feed-table, composed of two parts 66 66, separated by a slot 67, Fig. 9, which slot constitutes the pathway for the stem of the tobacco-leaf, the latter when being conveyed to the machine being spread outward, as indicated in Fig. 11, with its stem disposed within the said slot 67. The front edges of the table-sections 66 curve downward, as indicated in Figs. 7, 10, 11, and 12, while the remaining portions of said table-sections extend horizontally inward and terminate adjacent to a roller 68, as more clearly shown in Figs. 10 and 12, the upper edges of said roller 68 being about on a line with the upper surface of said table-sections 66 and being grooved in line with the slot 67, intermediate said table-sections, as indicated at 69 in Fig. 11, the groove 69 in said roller 68 being provided to permit of the convenient passage of the stem of the tobacco-leaf. At the extreme front of the table-sections 66 and partly inclosed by the front curved portions of said sections is mounted the roller 70, which in line with the slot 67 intermediate said table-sections is provided with the annular groove 71, this groove being also provided to facilitate the inward passage of the stem of the tobacco-leaf. Located above the roller 70 is mounted the shaft 72, upon the central portions of which are secured rubber or other flexible or yielding rollers 73, the latter being adapted to turn with said shaft 72 and aid in feeding inward the tobacco-leaf. The rollers 73 have their adjacent ends separated from one another a slight distance, as shown in Fig. 7, corresponding with the groove in the roller 70 and the slot 67, intermediate the table-sections 66. The roller-shaft 72 is given a rotary motion from the main driving-shaft through a chain of gear-wheels, as hereinafter explained.

The belts for feeding inward and booking the tobacco-leaves are designated by the numeral 74, and these two belts pass over the rollers 70 and 68, above referred to, and are separated from each other at their adjoining edges, as shown in Fig. 7, a distance substantially equal to the width of the grooves in said rollers 70 and 68 and corresponding with the width of the slot 67, intermediate the table-sections 66, it being the purpose of the belts 74 to take the two halves of the tobacco-leaf and permit the stem to escape through a suitable chute 75 in the manner hereinafter described. The belts 74 are continuous and during the operation of the machine have a traveling motion over the rollers which support the same. The belts 74, commencing with the front roller 70, extend inward over the top of the table-sections 66, thence pass downward over the roller 68 and around the booking cylinder or drum 58 to the roller 76, thence around said roller 76 and over the rollers 77 and 78, as shown in Fig. 10, and thence downward and around suspended belt-pulley wheels 79, as shown in Fig. 3, thence upward over rollers 80, and thence toward the front of the machine and over rollers 81, from which said belts continue upward and around the aforesaid front roller 70 or to the point of beginning, as shown in Fig. 10, the said belts 74 being continuous and having a simultaneous motion and each of said belts at its suspended portion in rear of the machine passing over the pulleys 79. It is desirable that the belts 74 shall be kept under a yielding tension to accommodate the accumulation of leaves upon the booking cylinder or drum 58, and hence the pulley-wheels 79 are provided in the suspended portion of said belts, as shown in Fig. 3, and said wheels 79 are each connected with a coiled spring 82, which is secured at its lower end by means of a hook 83, as shown in Fig. 3, and which affords a yielding tension for the belts 74, keeping the latter taut, but permitting a yielding of same around the booking cylinder or drum 58 whenever necessary. The accumulation of stripped leaves will take place, owing to the stoppage of the booking cylinder or drum 58 at the end of each revolution, between the exterior surfaces of said cylinder or drum and the belts 74, and by reason of the varying thickness of the accumulating tobacco-leaves on the cylinder or drum 58 during the formation of a book the said cylinder or drum is mounted between the swinging arms 56, so that said cylinder or drum 58 may yield rearward under the pressure of the tobacco-leaves. It is desirable that the cylinder or drum shall have a yielding tension drawing it toward the roller 68 at the rear edge of the table-sections 66, and to this end I provide at the left-hand side of the machine the coiled spring 84, as indicated in Figs. 7 and 10, one end of which is secured to the left-hand supporting-arm 56 and the other end of which is secured to the left-hand side frame 50. The spring 84 simply serves to draw the booking cylinder or drum 58 toward the rear edge of the feed-table sections 66 and allows said cylinder or drum 58 to yield rearwardly under the pressure of the tobacco-leaves when the latter accumulate upon said cylinder or drum. It is also desirable that convenient means be provided for the removal of the book of tobacco-leaves after the same has been formed upon the cylinder or drum 58, and to this end the upper front roller 76, over which the belts 74 travel, is mounted between the lower front ends of a frame comprising the arms 85 85 and shaft 86, the latter being freely mounted in bearings in the side frames 50 and receiving upon its central portion the rollers 77, over which the belts 74 travel. The arms 85 are pinned to the shaft 86, and the shaft 86 is free to turn in its bearing, and hence the arms 85 may be turned upward when desired, so as to carry the roller 76 upward from the booking cylinder or drum 58, so as to expose the front portion of the latter to enable the removal of the book from between said cylinder or drum and the belts 74, encompassing the same. In order that the roller 76 and arms 85, together with the parts carried by said arms, may be conveniently elevated, I provide upon the right-hand end of the shaft 86 the handle 87, (more fully shown in Figs. 1, 2, 7, and 17,) said handle being shown in side elevation in Fig. 2 and being provided with apertures 88 and 89, by which, in connection with a pin 90, extending out through the side of the machine, the said handle 87 may be locked in either its lower or its upper position. The roller 76 and arms 85 are shown in their lower position in Figs. 1 and 10, and when said parts are in their lower position the pin 90, Fig. 7, will extend through the side frame 50 and into the aperture 88 of the handle 87, this pin then serving to lock the handle 87, arms 85, and parts carried by said arms in their lower position. When it is desired to remove the book of leaves from the cylinder or drum 58, the operator will grasp the outer portion of the handle 87, withdraw the pin 90 outward from the aperture 88 of said handle, and then draw the handle upward, thus elevating the arms 85 and the parts carried thereby, and when the handle 87 has reached its upper position it may be there locked by the insertion of the pin 90 into the lower receiving-aperture 89 of said handle. The arms 85, with the parts carried thereby, may be restored to their lower position by again drawing the pin 90 outward to relieve it from the aperture 89 of the handle 87 and allow said handle and said arms 85 to descend to their former position, (shown in Fig. 10,) where they will be secured by the reinsertion of the pin 90 into the aperture 88 of said handle 87.

The hinged arms 85, carrying the roller 76, carry at their lower front portion the hood 91, (shown in section in Fig. 10 and illustrated in greater detail in Figs. 7, 17, and 18,) which hood partly incloses the roller 76 and has mounted between the sides of its lower portion brush-shaft 92, carrying the brush 93, and at its right-hand end the said hood 91 covers the gear-wheels 94, 95, and 96, (indicated by full lines in Fig. 18,) the gear-wheel 96 being on the end of the brush-shaft 92, the gear-wheel 95 being an idler, and the gear-wheel 94 being on the end of the roller 76. When the arms 85 are in their lower position, the gear-wheel 96 will be in engagement with the large gear-wheel 64, hereinbefore referred to, which is actuated from the main driving-shaft 53 and which when the machine is in operation will impart motion through the gear-wheel 96 to the brush 93, and also through said gear-wheel 96, idler 95, and gear-wheel 94 to the roller 76, upon which the belts 74 travel. The belts 74, thus at the roller 76 as well as at the roller 70, as hereinafter explained, have motion imparted to them simultaneously with the rotation of the brush 93, which acts against the belts 74 as the latter move over the roller 76, Fig. 10, and prevents the stripped leaves from traveling outward and upward with said belts, said brush 93 moving the leaves inward against the drum 58. The rollers 77, 78, 79, 80, 81, and 68, over which the belts 74 travel, simply turn freely and have no power imparted to them other than that which causes them to revolve by the friction of the traveling belts 74. The front roller 70, however, has power transmitted to it from the driving-gear 64 through the gear-wheel 97, (see Fig. 1,) which is engaged by the driving gear-wheel 64 and engages the idler 98, which is in mesh with the gear-wheel 99, located at the end of the shaft of the said roller 70. The roller 70 imparts traveling motion to the belts 74 and, as indicated, receives its motion from the main driving-shaft through the gear-wheel 62 thereon, the pinion-wheel 63, Fig. 13, gear-wheel 64, gear-wheel 97, Fig. 1, idler 98, and gear-wheel 99. Thus the traveling belts 74 receive their power from the driving gear-wheel 64 through the front roller 70 and the roller 76, the latter being between the lower portions of the swinging arms 85, and said belts 74 are, as above explained, kept taut upon the rollers hereinbefore referred to by means of the springs 82, connected with the rollers 79, located in the bend of the rear suspended portion of said belts. The gear-wheel 99, by which the roller 70 is actuated, engages the pinion-wheel 100, Fig. 1, which is on the shaft 72 of the feed-rollers 73, the latter, as shown in Fig. 10, being directly over the roller 70 and in near relation to the then upper surfaces of the adjacent portion of the belts 74. The rollers 73 are feed-rollers and coöperate with the belts 74 in carrying inward the tobacco-leaves.

Centrally over the feed-table and arranged to partly enter the slot 67 intermediate the sections 66 of said table is mounted the presser-wheel 101, which is adapted to engage the stems of the inwardly-fed leaves and is secured upon the inner end of the presser-wheel shaft 102, (see Fig. 7,) which has upon its outer end the gear-wheel 103, by which said shaft 102 and presser-wheel 101 are rotated. The gear-wheel 103 receives its motion from the aforesaid gear-wheel 97 through the pinion-wheel 104, in engagement with said gear-wheel 97, and the idler 105, which is engaged by said pinion-wheel 104, and itself engages said pinion-wheel 103 on the end of the presser-wheel shaft 102. The presser-wheel shaft 102, together with the gear-wheel 103 and idler 105, is carried by a cast frame 106, which is loosely hung upon the shaft 107 and having at its right-hand end the arm 108, (shown in detail in Fig. 4,) which carries the adjusting-finger 109, the latter being adapted, as indicated in Fig. 1, to contact with the periphery of a wheel 110, (see Figs. 19 to 22, inclusive,) composed of the cam-section 111 and rim 112, the latter being formed, as shown in Fig. 22, integral with and at the outer side of the large driving gear-wheel 64. During the operation of the machine the wheel 64 rotates, and in consequence the wheel 110 will likewise rotate and its periphery will move against the inner end of the finger 109, carried by said arm 108, which is integral with the frame 106. The frame 106 is loosely mounted upon the shaft 107 and is adapted to have a hinged or oscillatory motion thereon when moved. The form of the periphery of the wheel 110 and the relation of the arm 108 to said periphery control the relation of the presser-wheel 101 to the slot 67 between the table-sections 66, and in consequence control the pressure that said wheel 101 shall exert upon the stem of the tobacco-leaves fed into the machine. The finger 109, carried by the arm 108, is kept in firm but yielding contact with the periphery of the wheel 110 by means of a coiled spring 113, (see Fig. 4,) one end of which is secured to the arm 108 and the other to the side frame of the machine. The finger 109 is adapted to move within a guide at the upper inner end of the arm 108 and is slotted, as shown in Fig. 5, at 114 to admit the screws 115 (shown in Fig. 4) without interference with its own sliding motion. The outer front end of the finger 109 is bent over at an angle, as shown in Fig. 4, and receives the adjusting-screw 116, which enters the body of the arm 108 and which when turned in one direction will push the finger 109 toward the rim of the wheel 110 and when turned in the other direction will draw the said finger 109 in a direction frontward from said wheel. No matter what the position of the screw 116 may be during its inward and outward adjustment the spring 113 will always retain the inner point or end of the finger 109 against the rim of the wheel 110, and hence so far as the adjustment of the finger 109 is concerned it will be evident that when the finger 109, by means of the screw 116, is adjusted outward from the wheel the arm 108 will move nearer inward toward said wheel with the effect of turning the front portion of the cast frame 106, carrying the presser-wheel shaft 102 and presser-wheel 101 upward, thus moving the presser-wheel 101 more or less upward in accordance with the degree of adjustment that may be given to the finger 109. When by means of the screw 116 the finger 109 is moved toward the rim of the wheel 110, the stress of the spring 113 will be overcome and the arm 108 will turn upward toward the front of the machine with the effect of causing the cast frame 106 at its front portion to move correspondingly downward, whereby the presser-wheel 101 will be caused to pass farther downward within the slot between the table-sections 66. Thus assuming that the rim of the wheel 110 is continuous and uniform, which may readily be the case, the exact relation of the presser-wheel 101 to the stems of the tobacco-leaves fed into the machine may be controlled at will by simply adjusting the finger 109 in its relation to the wheel 110 by means of the screw 116. Different quantities of tobacco-leaves will differ in character and in the uses to which they are to be put, and hence it is highly desirable that the presser-wheel 101 be capable of adjustment with relation to the pressure which it shall apply upon the stems of the tobacco-leaves fed inward to the machine.

The knives for removing the stems from the leaves are numbered 117 and 118, respectively, and they, as hereinafter more fully described, are located below the table-sections 66 and have their meeting edges in line with the slot 67, intermediate said table-sections and in rear of the lower central portion of the presser-wheel 101, and it is the purpose of said presser-wheel 101 while the halves of the spread-out tobacco-leaves are being carried inward over said table-sections 66 to press the stem of the leaf downward, so that said stem shall be cut from the leaf by means of said knives 117 and 118. It will be seen, therefore, that it is in many instances desirable that said presser-wheel 101 may be adjusted vertically, so that it may be adapted to the varying conditions of tobacco-leaves and be so regulated as to enable the removal of the whole or any special portion of the stems from the leaves. In the absence of the presser-wheel 101 the leaves would be fed inward over the table-sections 66 without having their stem removed, but with the employment of the presser-wheel 101, engaging the stems of the leaves as said leaves are conveyed inward, the said stems are pressed downward between the table-sections 66 to a sufficient extent to be removed by the knives 117 and 118. It is probably apparent that by adjusting the finger 109, connected with the frame 106, carrying the presser-wheel 101 and its shaft 102, the amount of pressure which the wheel 101 shall exert upon the stem of the tobacco-leaf may be regulated at will, and hence that by regulating the relation of the wheel 101 to the tobacco-leaves the stems may be very cleanly cut from the leaves without consuming any appreciable portion of the web part of the leaves, thus securing economy in the stemming of the leaves. I have found by experience in the operation of the machine shown in this application that the stems may be so cleanly cut from the leaves that none of the available portion of the latter is wasted, and that when desired I may even leave the skin of the stem connecting the two halves of the leaves, the lower and inner wood portion of the stem being removed. The presser-wheel 101 may be so nicely adjusted that instead of removing the stem entirely from the leaf the said stem may be simply split throughout its length without the two halves of the leaf having been separated from one another. I mention these facts at this place so as to indicate the desirability of the adjustable feature of the presser-wheel 101. A further adjustment of the presser-wheel 101 may be attained with the use of the present machine, so that said wheel will not commence its action upon the tobacco-leaf until the fine end portion of the same has for a predetermined distance been conveyed inward beyond the influence of the knives 117 and 118, and this further adjustment may by hand be accomplished by means of the screw 116 and adjustable finger 109; but said adjustment is preferably secured by so conforming the periphery of the wheel 110, which contacts with said finger 109, that said finger may be allowed during a predetermined period to remain at an inward position under the force of the spring 113 sufficient to insure the proper elevation during said period of the wheel 101 above the tobacco-leaf, allowing the latter during said period to be fed inward over the table-sections 66 without its central portion being pressed downward through the slot 67, intermediate the table-sections, and consequently without meeting the knives 117 and 118. As a means for accomplishing this adjustment of the wheel 101 by means of the conformation of the periphery of the wheel 110 I construct said wheel of the cam-section 111 and rim 112, as more clearly indicated in Figs. 19 to 22, inclusive, and in which it will be seen that the cam-section 111 has its periphery recessed or cut from a true circle, as at 119, and that said cam-section is provided with slots 120 to receive screws 121, by which the cam-section is secured against the outer face of the wheel 64 and in line with the rim 112 of said wheel. The wheel 64 is formed with a hub 122, upon which the cam-section 111 is placed and around which said cam-section may be adjusted at will by reason of the slots 120 and screws 121. The rim 112 of the wheel 64 has its periphery recessed or turned from a true circle, as at 123, (see Fig. 19,) the recess 123 conforming with the recess 119 of the cam-section 111. When the cam-section 111 is placed on the hub 122 in such position that its recess 119 shall tally with the recess 123 of the rim 112, it will be apparent that for the length of said recesses the circular periphery of the wheel 110 will be broken, and that during the rotation of said wheel the adjustable finger 109, carried by the arm 108 and cast frame 106, will when the recesses 119 and 123 reach the same pass into said recesses, the spring 113, connected with the arm 108, pulling said finger 109 into the recesses. During the presence of the recesses 119 and 123 of the wheel 110 at the finger 109, the latter then being in an inward position, the front portion of the frame 106 and the presser-wheel 101 will be in an elevated position, said wheel 101 then not being against the tobacco-leaf. In order that this portion of the construction may be clearly understood, I will explain that the recesses 119 and 123 of the wheel 110 are so disposed with relation to the booking cylinder or drum 58 that when the latter reaches the end of its revolution the deeper portion of said recesses 119 and 123 reach the finger 109 and permit the latter to enter the same. Thus every time the machine comes to a stop at the end of each revolution of the drum 58 the adjusting-finger 109 enters the deeper portion of the said recesses 119 and 123 of the wheel 110 and the presser-wheel 101 elevates, this being its normal at-rest position. When the machine again starts in motion, the fine or pointed end of the tobacco-leaf is conveyed inward upon the belts 74 and below the rollers 73, and at the same time the wheel 110 starts in motion and the recesses 119 and 123 have the end of the adjusting-finger 109, and during the rotation of the wheel 110 and while said recesses have said finger 109 the presser-wheel 101 will remain elevated, and during this period of elevation of said presser-wheel the leaf may feed inward without coming into contact with the knives 117 and 118. Thus for a period governed by the length of the recesses 119 and 123 of the wheel 110 the tobacco-leaf may feed inward without being acted upon either by the presser-wheel 101 or knives 117 and 118. When, however, the end of the recesses 119 and 123 of the wheel 110 is reached, the adjusting-finger 109 will be forced outward upon the circular periphery of the wheel 110, and then during the continued rotation of said wheel the presser-wheel 101 will be held in its lower position against the tobacco-leaf with the effect of causing the stem of said leaf to be acted upon by the knives 117 and 118. Thus by means of the construction of the wheel 110 the operator may permit the leaf to feed inward for a predetermined distance without being acted upon by the knives 117 and 118, and this is important on some occasions, especially where the leaves are to be used for filler purposes, since thereby the good end portion of the leaves are not wasted by being cut into by the knives 117 and 118, while the objectionable stem portions are removed by said knives, said knives beginning to cut the stem from the leaf as soon as the recesses 119 and 123 of the wheel 110 passes from the adjusting-finger 109 and forces said finger outward, and thereby turns the cast frame 106 and presser-wheel 101 frontward and downward. It is of course desirable that the length of time the presser-wheel 101 shall remain out of contact with the stem of the tobacco-leaf shall be regulated, and hence I provide that the cam-section 111 of the wheel 110 shall be adjustable axially upon the hub 122, Figs. 19 to 21, inclusive, and that the end of the adjusting-finger 119 shall be wide enough to engage the periphery of both the cam-section 111 and adjacent rim 112.

When the recess 119 of the cam-section 111 exactly tallies with the recess 123 of the rim 112, the longest recess attainable in the periphery of the wheel 110 will be secured, and to shorten this recess, so that the presser-wheel 101 shall not for so long a period remain elevated above the tobacco-leaf, it is only necessary to loosen the screws 121 and adjust the cam-section 111 axially on the hub 122, so that the recess 119 in said cam-section will partly cover the recess 123 in said rim 112, thereby shortening the recess in the periphery of the wheel 110 and limiting the period at which the finger 109 shall remain inward and the presser-wheel 101 upward. As the end of the finger 109 is broad enough to engage the edges of both the cam-section 111 and rim 112 the said finger will not spring inward into the recess of the periphery of the wheel 110 until it reaches a point at which the recesses 119 and 123 are in line with one another. Thus if the cam-section 111 were assumed to be upon the hub 122 of the wheel (shown in Fig. 19) and turned so that the middle portion of said recess 119 were brought to the deeper or first portion of the recess 123 of the rim 112 the end of the adjusting-finger 109 could not enter either recess until it reached the said first portion of the recess 123, when it would enter both recesses together. The result of this adjustment of the cam-section 111 would be that the length of the combined recess formed by the tallying portions of the recesses 119 and 123 would be shortened by about one-half, and consequently during the subsequent rotation of the wheel 64 and wheel 110 the adjusting-finger 109 would not remain at its inward position for so great a period and the presser-wheel 101 would not remain from contact with the tobacco-leaf so great a period of time. Thus by adjusting the cam-section 111 upon the hub 122 the length of the recess in the periphery of the wheel 110 through which the finger 109 may travel may be regulated at will, and consequently the length of leaf which may be fed inward below and without contacting with the presser-wheel 101 may be absolutely controlled, since the longer the recess in the wheel 110 the greater period will the presser-wheel 101 remain elevated and the more extended will be the length of leaf which will feed inward without being acted upon by the knives 117 and 118. The presser-wheel 101 may be thus adjusted to a nicety by means of the finger 109 and screw 116, Fig. 4, and may also be subject to regulation by means of the formation of the periphery of the wheel 110. When the recess 119 of the cam 111 is drawn entirely from all tally with the recess 123 of the rim 112, the wheel 110 will have a continuous uniform circular periphery on which the finger 109 will travel, and at such time all of the adjustment of the presser-wheel 101 will have to be secured by means of the adjusting-screw 116, and this condition of the machine will be found useful when it is desired to remove all of the stem from the tobacco-leaves and split said leaves from end to end into two halves, the halves of the leaves being carried inward upon the belts 74 and booked in rights and lefts for wrappers. Even when it is desired to thus split the leaves in halves from end to end it will not be necessary to have the continuous circular periphery on the wheel 110, since it is convenient to have a recess in said wheel 110, so that when the machine comes to a stop at the end of each revolution of the drum 58 the presser-wheel may elevate slightly and remain elevated until the point of the succeeding leaf to be conveyed inward during the next rotation of said drum 58 may reach or about reach said presser-wheel before the latter descends, thus giving the belts 74, in conjunction with the rollers 73, an opportunity to feed inward a portion of the end of the leaf to the presser-wheel 101 before the latter descends to deliver the stem of the leaf to the knives 117 and 118. In every instance where the periphery of the wheel 110 is provided with a recess to receive the end of the finger 109 this recess will be arranged to receive said finger at the time the booking cylinder or drum 58 completes its revolution and comes to a stop, so that the normal at-rest position of the presser-wheel 101 will be with said wheel slightly elevated. The wheel 110, being connected with the driving-gear wheel 64, will of course rotate with the latter.

During the adjustment of the presser-wheel 101 with relation to the tobacco-leaf the cast-frame 106, carrying said wheel and its shaft 102, has a pivotal motion upon the shaft 107, upon which the gear-wheel 104 is secured, and hence the adjustment of the presser-wheel 101 and the movement of the cast-frame 106 has no tendency whatever to disengage either the gear-wheel 104 from the gear-wheel 97 or to break the gear connection between the gear-wheel 103 on the presser-wheel shaft 102 with the gear-wheel 104.

The knives 117 and 118 have been hereinbefore referred to with respect to their relation to the feed-table sections 66 and presser-wheel 101, and these knives are probably more clearly illustrated in Figs. 9, 10, 11, 12, 15, and 16, in which it will be seen that the said knives are in the form of disks secured upon the upper ends of spindles 130 130, which are seated in rotatory sleeves or sockets 131, mounted in a substantially vertical position within bearing-apertures formed in a transverse casting-frame 132 extending transversely between the side frames 50 of the machine and below the feed-table sections 66. The transverse frame 132 may be of any suitable construction. The rotatory sleeves 131 have the knife-spindles 130 secured to rotate with them by means of pins 133, which enter either vertical slots 134, formed in the knife-spindles, said pins 133 compelling the knife-spindles 130 to rotate with the sleeves 131, and said slots 134 permitting said knife-spindles to have a limited vertical motion or adjustment. The edges of the knives 117 and 118 overlap or engage each other, so as to effect the cutting of the stems from the tobacco-leaves, and upon the hubs of said knives are the rubber coverings 135, which constitute rollers traveling with the said knives and adapted to engage and feed inward the stems as the latter are cut from the tobacco-leaves. The rollers 135 are solely for engaging the stems of the tobacco-leaves and feeding said stems inward to the upper end of the chute 75, by which said stems are directed laterally from the machine, the trend or direction of said chute, which is simply a hollow delivery, being indicated in Figs. 7, 10, and 11. The upper end of the aforesaid chute 75 is directly in the rear of the rubber stem-feeding rollers 135, and the lower end of said chute 75 will terminate at any convenient point to one side of the machine. Since the rubber rollers 135 are on the hubs of the knives 117 and 118, said rollers will only act when said knives are in motion, and hence said rollers will not injure the tobacco-leaves, but, owing to their position adjacent to the cutting edges of and their timing with the knives, will by drawing inward on the tobacco-stems aid said knives in the correct performance of their duty. The lower ends of the rotatory sleeves 131 carry bevel gear-wheels 136 in engagement with the bevel gear-wheels 137 on the transverse shaft 138, as more fully shown in Fig. 9, and when the machine is in operation and the shaft 138 is rotating the motion of the latter will be communicated through said bevel gear-wheels 137 and bevel gear-wheels 136 to the rotatory sleeves 131 and knife-spindles 130, with the result that the knives 117 and 118, with their stem-feeding rollers 135, will have the proper rotary motion toward one another to effect the proper severance and inward feeding of the tobacco-stems. The shaft 138 for driving the knives 117 and 118 receives its motion from the large driving gear-wheel 64 through the gear-wheel 97 (see Fig. 1) and pinion 139, the latter being on the outer or right-hand end of the shaft 138 and being in engagement with the gear-wheel 97. The knife 118 has its edge below the edge of the knife 117, and the spindle of the knife 118 has provided upon it the coiled spring 140, which presses upward against said spindle and serves to keep the edge of the knife 118 firmly though yieldingly in contact with the edge of the knife 117. The knives 117 and 118 are disposed at a slight angle to one another—that is, the knife 117 is slightly tilted frontward and downward and the knife 118 is slightly tilted rearward and downward, the tilting of the knives 117 and 118 being thus in opposite directions and causing their edges to engage one another at a point in advance of a horizontal line extending centrally across said knives. This tilting of the knives 117 and 118 is illustrated in Figs. 15 and 16 on a somewhat-exaggerated scale, since the tilting of the said knives is of so limited an extent that if shown with technical accuracy it probably would not be discovered with the naked eye. The upper surfaces of the knives 117 and 118 are substantially horizontal, the tilting of said knives from the horizontal position being only to an extent equal to about from two to five one-thousandths of an inch. This tilting of the knives 117 and 118, although slight, is of very great importance in that the knives are thereby the better enabled to cleanly cut the stem from the tobacco-leaves, their edges are automatically kept in a clean and sharpened condition, and said knives at a point to the front of the horizontal central line passing through them contact at substantially a single point, which is of very great advantage both as regards the effectiveness and longevity of the knives. The knives 117 and 118 rotate toward one another and, as hereinbefore explained, are below the feed-table sections 66 and in rear of the central vertical plane of the presser-wheel 101. During the inward travel of the tobacco-leaf the periphery of the presser-wheel 101 engages the stem of the leaf and presses the same downward to a sufficient extent for the knives 117 and 118 to cut said stem from the leaf, the stems being fed inward by the stem-feed rollers 135 and the halves of the leaf being fed inward by the belts 74 and inner feed-rollers 207, carried by the shaft 107.

I have described hereinbefore all of the operative features of the machine made the subject of this application, with the exception of the clutch mechanism and belt or alarm mechanism, and such mechanisms will be hereinafter described.

It is appropriate at this point to a little more fully refer to the operation of the machine, as hereinbefore described, it being understood that the driving-shaft 53 is automatically arrested at the completion of each rotation of the booking cylinder or drum 58. The machine having been started in motion and the presser-wheel 101 having been adjusted as desired, in the manner hereinbefore described, the leaf of tobacco will be spread outward, as indicated in Fig. 11, and have its pointed end presented upon the belts 74 at the front edge of the feed-table sections 66. The belts 74 travel inward and the feed-rollers 73 rotate, and between these belts and said rollers the leaf will be carried inward below the presser-wheel 101, said wheel 101 during the inward travel of the leaf pressing the stem portion of the leaf downward into the slot between the said table-sections 66 in order that the stem of the leaf may pass into the path of the then rotating cutters or knives 117 and 118. During the inward travel of the tobacco-leaf the knives 117 and 118 will remove the stem therefrom, and the stem will be caused to feed inward, owing to the contact of the rubber stem-feeding rollers 135 therewith. The stem of the tobacco-leaf will by means of the rollers 135 be pushed inward into the upper end of the chute 75 and be directed through the latter to its lower discharge end, where the stems one after another will fall from the machine. The two halves of the tobacco-leaf will continue to move inward upon the belts 74 and be by said belts carried downward and upon the booking cylinder or drum 58, where they will remain to be booked. The leaves are one after another fed inward over the feed-table section 66, and the stripped halves of the leaves are allowed to accumulate upon the drum 58 until a book of the desired predetermined number of the leaves has been formed upon the said drum. The drum 58 stops at the end of each revolution, and during each revolution said drum receives one leaf, the leaves arranging themselves automatically upon one another intermediate the surfaces of the drum and the adjoining surfaces of the belts 74. After each leaf has been admitted upon the drum 58 and the machine has stopped the operator simply by pressing on the foot-treadle, as hereinafter described, restarts the machine. After the book comprising the required number of stripped leaves has been formed upon the cylinder 58 the operator will withdraw the pin 90 from the handle 87 and move the arms 85 85, carrying the roller 76 and hood 91, to their upward position, where said parts will be held by the insertion of the pin 90 into the lower aperture 89 of said handle 87, and thereupon the operator will withdraw the book of leaves from off the cylinder or drum 58 by allowing the cylinder 58 to make one rotation to feed said book outward from itself, and then the operator will restore the handle 87 and arms 85, with the parts carried by said arms, to their lower position, (shown in Fig. 1,) securing or locking said parts in their lower position by the insertion of the pin 90 into the aperture 88 of said handle 87. The machine will then be in condition to be continued in use in stripping and booking the leaves. The cylinder or drum 58 receives its motion from the gear-wheel 62 on the main driving-shaft 53 through the pinion-wheel 61, Fig. 13, and gear-wheel 60, the said gear-wheel 60 being fastened upon the shaft 57 of said drum 58. All of the other parts of the machine which are driven by power receive their motion from the gear-wheel 62 on the driving-shaft 53 through the pinion 63, driving gear-wheel 64, and the other chains of gearing which have been hereinbefore specifically described and are connected with said driving gear-wheel 64. The adjustment of the presser-wheel 101 is effected by the adjustable finger 109 in connection with the wheel 110, carried by the said driving gear-wheel 64, and the manner of effecting the adjustment of the said presser-wheel 101 has been fully explained hereinbefore.

The clutch mechanism on the main driving-shaft 53 is illustrated in detail in Figs. 23 to 30, inclusive, and, as may be observed in said figures, the belt-wheel 54 is loosely mounted upon the shaft 53 and is formed with the annular rim 141, which is notched or toothed on its inner surface, as shown in Fig. 23, and which at its outer edge is engaged by the plate 142, as shown in Fig. 24, said plate 142 being integral with the ratchet-wheel 143 on the driving-shaft 53. Upon the driving-shaft 53 within the chamber formed by the rim 141 of the belt-wheel 54 is secured the block 144, (shown in position in Figs. 22 and 24 and in detail in Figs. 29 and 30,) which block 144 has pivotally mounted upon it the dog 145, whose engaging outer end is normally pressed outward toward the rim 141 by means of a spring 146, seated within the block 144. Upon the inner face of the plate 142, carried by the ratchet-wheel 143, are formed the projections 147 148, as shown in Figs. 25 and 26, and when the plate 142 is against the rim 141 of the belt-wheel 54 the projection 147 passes below the shank end of the dog 145 and the projection 148 is disposed in near relation to the angular end 149 of the block 144. When the parts of the clutch are in position, the dog 145 will by reason of the spring 146 engage the notched rim 141 of the belt-wheel 54, and when said dog is thus in engagement with the rim 141 the motion of the belt-wheel will be imparted through said dog 145 and block 144 to the driving-shaft 53, with the result that said shaft will be rotated and the machine set in motion. When, however, the ratchet-wheel 143 is arrested by the means hereinafter described, its plate 142 then being stationary, the spring-pressed pin or buffer 247 in the projection 147 on said plate will engage the shank end of the dog 145 and turn said dog upon its pivot, so that its outer end will become freed from the rim 141, and at this time, the plate 142 being stationary and the dog 145 being free of said belt-wheel 54, the latter will continue in motion without rotating the driving-shaft 53. In order to restore the engagement of the dog 145 with the rim 141 on the belt-wheel 54, it will simply be necessary to release the means holding the ratchet-wheel 143 and plate 142 stationary, and upon this being done, said wheel 143 and plate 142 being free on the shaft 53, the spring 146 will force the outer end of the dog 145 into reëngagement with the rim 141 of the belt-wheel 54, and thereupon, as before, the motion of the belt-wheel 54 will be communicated to the driving-shaft 53 and the machine set in motion. The detailed form of the dog 145 is shown in a bottom view in Fig. 27 and in a side view in Fig. 28, and the ratchet-wheel 143 and its plate 142 are shown in horizontal section in Fig. 25, said section being on the dotted line 25 25 of Fig. 26, which shows the inner face of said plate 142 with the projection 147 in section. The clutch mechanism shown in Figs. 23 to 30, inclusive, will be found entirely satisfactory; but I do not of course limit the invention to this special clutch mechanism, since various forms of clutch mechanism are well known for stopping the driving-shaft of a machine at the end of each revolution of some special part of the machine.

The means hereinbefore referred to for holding the ratchet-wheel 143 and its plate 142 stationary, so as to cut off the power of the belt-wheel 54 from the driving-shaft 53, are two pawls numbered 155 and 156, which pawls are shown in position in Figs. 7, 23, and 24 and in detail in Figs. 31 to 34, inclusive, Fig. 31 being a top view, and Fig. 32 a side view, of the pawl 155, and Fig. 33 being a top view, and Fig. 34 a side view, of the pawl 156. The pawls 155 156 are respectively connected by chains 157 and 158, respectively, with foot-treadles numbered, respectively, 159 and 160. (Indicated in Fig. 3.) I may here mention that the pawl 156 is connected with a spring 161, Fig. 23, which normally keeps said pawl 156 free of the ratchet-wheel 143, and that said pawl 156 is in effect an emergency-pawl, since it is only intended to be brought into use when the operator upon the happening of some emergency desires to stop the machine prior to its regular stopping-point, which is at the end of each revolution of the booking cylinder or drum 58. Should the operator at any time desire to stop the machine, he will simply press upon the foot-treadle 160, and thereby pull the chain 158 and throw the pawl 156 into engagement with the ratchet-wheel 143, this having the effect of stopping said wheel, and thereby through the coaction of the projection 147 or its pin 247 with the shank end of the dog 145, cutting off the power of the belt-wheel 54 from the driving-shaft 53. The pawl 156 may therefore be termed an "emergency-pawl," and it will only be used when the operator for some reason shall desire to manually stop the machine. The spring 161, Fig. 23, is prevented from turning the engaging end of the pawl 156 too far downward by the interposition of the stop 162, arranged to engage a toe 163, formed on the pawl 156, and thereby arrest said pawl. The pawl 155 for engaging the ratchet-wheel 143 is of importance, in that thereby with its coacting parts the power of the belt-wheel 54 is cut off from the driving-shaft 53 at the end of each revolution of the booking cylinder or drum 58. The pawl 155 is fast upon the short rock-shaft 164, while the pawl 156 is loose upon said rock-shaft. The spring 161 (see Fig. 23) exerts its force normally to keep the end of the pawl 156 from the ratchet-wheel 143 and to move the end of the pawl 155 into engagement with said ratchet-wheel. The pawl 156 is caused to engage the ratchet-wheel 143 by a downward pull from the foot-treadle 160 on the chain 158, and the engaging end of the pawl 155 is pulled from the ratchet-wheel 143 by means of the depression of the foot-treadle 159 and the drawing downward thereby on the chain 157. The pawl 155 coöperates with an arm 165, (see Fig. 1,) which at its upper end is fast upon the aforesaid rock-shaft 164, and at its lower end carries a roller which is kept spring-pressed by means of the spring 161 against the exterior surfaces of the hub 122, hereinbefore described, and which hub is integral with the driving gear-wheel 64. During the rotation of the gear-wheel 64 the hub 122 moves against the roller at the lower end of the arm 165, and at the end of each rotation of the driving gear-wheel 64 the said roller enters a recess 166 formed in said hub 122. The driving gear-wheel 64 performs one revolution with each revolution of the booking cylinder or drum 58, and hence at the end of each revolution of the booking cylinder or drum 58 and driving gear-wheel 64 the lower end of the arm 165 springs into the said recess 166 of the hub 122, and this has the important effect of allowing the spring 161 freedom to move the end of the pawl 155 into engagement with the ratchet-wheel 143 on the main driving-shaft, and of thereby effecting the cutting off of the power from the belt-wheel 54 to the driving-shaft 53, the latter and the operative parts of the machine thereby becoming arrested. It will be seen, therefore, that at the end of each revolution of the booking cylinder or drum 58 the pawl 155 will engage the ratchet-wheel 143 and effect the stoppage of the machine. When it is desired to restart the machine for the treatment of the next leaf of tobacco to be fed thereto, it is only necessary that the operator shall press upon the foot-treadle 159, and thereby pull the end of the pawl 155 from the ratchet-wheel 143, this freeing the ratchet-wheel 143 and permitting the spring 146 in the clutch mechanism to reëstablish the dog 145 into engagement with the rim 141 of the belt-wheel 54, whereupon the power of the belt-wheel 54 will be communicated to the driving-shaft 53 and the machine will be set in motion and continued in motion until the booking cylinder or drum 58 has made another revolution and the recess 166 of the hub 122 has again passed into a position to receive the lower end of the arm 165, connected through the shaft 164 with the pawl 155. The downward pull on the pawl 155 to release said pawl from the ratchet-wheel 143 effects, through the rock-shaft 164, the turning of the arm 165 outward from the recess 166 of the hub 122, and thus whenever the foot-treadle 159 is operated to relieve the pawl 155 from the ratchet-wheel 143 the arm 165 is at the same time relieved from the recess 166 of the hub 122, and no obstruction is thus present to the setting in motion of all of the operative parts of the machine from the power-wheel 54.

The mechanism for sounding the alarm at each time a predetermined number of the leaves have been stripped and accumulated upon the booking cylinder or drum 58 is more clearly illustrated in Figs. 35 and 36, in which it will be seen that upon the outer side of the side frame 50 is mounted a bell or gong 167, adapted to be struck by the hammer 168, which is caused to strike the gong 167 after a predetermined number of revolutions of the booking cylinder or drum 58 have been performed. The driving gear-wheel 64 and its hub 122, as hereinbefore described, make one revolution with each revolution of the booking cylinder or drum 58, and hence upon the said hub 122 I provide a pin 169 and utilize this pin as the means connected with the moving parts of the machine for actuating the bell mechanism. Within a frame 170, secured upon the side frame 50, is mounted a shaft 171, carrying a worm 172 and having at its inner end a star-wheel 173 in position to be engaged by the pin 169 on the hub 122 during each rotation of the driving-gear 64 and the booking cylinder or drum 58. Each contact of the pin 169 with the star-wheel 173 turns said star-wheel a limited distance, and thereby through the worm 172 rotates the gear-wheel 174 a limited distance. Upon the shaft 175 of the gear or pinion wheel 174 is secured a cam 176, which is engaged by an arm 177, carrying the hammer 168. The arm 177 has its engaging end kept in contact with the cam-wheel 176 by means of the spring 178, as shown more clearly in Fig. 35. After the gear-wheel 174 has moved a definite distance by its intermittent motion the end of the arm 177 will reach the end of a projecting part of the cam-wheel 176, and then, owing to the spring 178, have its engaging end quickly moved inward to an inner portion of said cam-wheel 176, and this inward projection by the spring 178 of the engaging end of the arm 177 will cause the hammer 168 to strike the gong 167, and thereby notify the operator that a book containing the requisite number of leaves has been formed upon the booking cylinder or drum 58. The cam-wheel 176 has three projecting portions, as shown in Fig. 35, and each of said projecting portions, which for convenience are numbered 179, is of such length that the booking cylinder or drum 58 will make fifty revolutions while the said projecting portion is traveling against the engaging end of the arm 177. The cam-wheel 176 will therefore only make one complete revolution during one hundred and fifty revolutions of the booking cylinder or drum 58, and at the end of each one-third of the rotation of the cam-wheel 176 the gong 167 will be sounded and the operator will be apprised that the time has arrived for removing the book from the cylinder or drum 58. The mechanism shown in Figs. 35 and 36 for sounding the alarm upon the formation of the several books of leaves will satisfactorily perform its work, and I recommend that the same be used as a part of the machine made the subject of this application; but I desire it to be understood that this invention is not limited to the employment of the alarm mechanism shown in Figs. 35 and 36, nor to any other character of mechanism for indicating the completion of the books upon the cylinder or drum 58.

The operation of the machine having been fully hereinbefore described prior to the explanation of the clutch mechanism on the driving-shaft and the bell mechanism presented in Figs. 35 and 36, and the operation of the said clutch mechanism and the said bell mechanism having been pointed out in connection with the description of the construction of said mechanism, it will be unnecessary to present any further explanation of the operation of the machine, the said operation having been fully set forth.

What I claim as my invention, and desire to secure by Letters Patent, is—

1. In a tobacco-stripping machine, a support for the leaf, said support having the opening or slot for the stem of the leaf, combined with the overlapping knives at said slot to sever the stem from the leaf, means for pressing the stem of the leaf into said slot and to the overlapping edges of said knives, and means for operating said knives; substantially as set forth.

2. In a tobacco-stripping machine, a support for the leaf, said support having the opening or slot for the stem of the leaf, combined with the overlapping knives at said slot to sever the stem from the leaf, means for directly engaging the stem of the leaf for pressing said stem into said slot and to the overlapping edges of said knives, and means for operating said knives; substantially as set forth.

3. In a tobacco-stripping machine, a support for the leaf, said support having the opening or slot for the stem of the leaf, combined with the overlapping knives at said slot to sever the stem from the leaf, the presser-wheel for pressing the stem of the leaf into said slot and to the overlapping edges of said knives, and means for operating said knives; substantially as set forth.

4. In a tobacco-stripping machine, a support for the leaf, said support having the opening or slot for the stem of the leaf, combined with the knives at said slot to sever the stem from the leaf, the presser-wheel for pressing the said stem into said slot and to said knives, and means for regulating the degree of pressure said wheel shall exert on said stem; substantially as set forth.

5. In a tobacco-stripping machine, a support for the leaf, said support having the opening or slot for the stem of the leaf, combined with the overlapping knives at said slot to sever the stem from the leaf, adjustable means for pressing the stem of the leaf into said slot and to the overlapping edges of said knives, and means for operating said knives; substantially as set forth.

6. In a tobacco-stripping machine, means for feeding the tobacco-leaf, and the overlapping knives for severing the stem from the leaf, combined with the stem-feeding rollers on the spindles of said knives, and means for pressing the stem of the leaf below the overlapping edges of said knives; substantially as set forth.

7. In a tobacco-stripping machine, means for feeding the tobacco-leaf in its open or spread-out condition, and the overlapping knives for severing the stem from the leaf, combined with means for pressing the stem of the leaf to the overlapping edges of said knives, and means for operating said knives; substantially as set forth.

8. In a tobacco-stripping machine, means for feeding the tobacco-leaf in its open or spread-out condition, and the overlapping knives for severing the stem from the leaf, combined with the presser-wheel for pressing the stem of the leaf to the overlapping edges of said knives, and means for operating said knives; substantially as set forth.

9. In a tobacco-stripping machine, means for feeding the tobacco-leaf, combined with the knives for severing the stem from the leaf, said knives overlapping one another at their adjoining edges and being slightly inclined from one another so that said edges shall contact at a single point in advance of a central line through the knives; substantially as set forth.

10. In a tobacco-stripping machine, the belts for feeding the tobacco-leaf, said belts being separated from one another to admit between their edges the stem of the leaf, and the feed-rollers to coöperate with said belts in feeding the leaf, combined with the knives for severing the stem from the leaf, and means for pressing the said stem to said knives; substantially as set forth.

11. In a tobacco-stripping machine, means for feeding the tobacco-leaf, and the knives for severing the stem from the leaf, combined with a presser device for engaging the stem of the leaf and pressing the same to said knives, and means for maintaining said device in an inactive position during a part of the movement of the machine and then moving said device into and maintaining it at an active position; substantially as set forth.

12. In a tobacco-stripping machine, means for feeding the tobacco-leaf, and the knives for severing the stem from the leaf, combined with a presser device for engaging the stem of the leaf, and pressing the same to said knives, means for regulating the degree of pressure said device shall exert on said stem, and means for maintaining said device in an inactive position during a part of the movement of the machine and then moving said device into and maintaining it at an active position; substantially as set forth.

13. In a tobacco stripping and booking machine, the main supporting-frame, the booking cylinder or drum, the hinged arms suspending said cylinder or drum, means for giving said cylinder or drum a yielding tension toward the front part of the machine, and a hinged frame-section connected with the main frame of the machine and extending over the upper front portion of said cylinder or drum, said hinged frame-section being capable of being raised from and lowered to said cylinder or drum, combined with means for rotating said cylinder or drum, means for removing the stems from the tobacco-leaves during their passage inward to said drum, continuous belts passing around said cylinder or drum and said hinged frame-section, and means for imparting a traveling movement to said belts; substantially as set forth.

14. In a tobacco stripping and booking machine, the main frame having the driving-shaft extended transversely across the top of same, the booking cylinder or drum, the hinged frame suspending said cylinder or drum, means for yieldingly pressing said drum toward the front portion of said frame, the gear-wheel on the shaft of said drum, gearing connecting said gear-wheel with the said driving-shaft for imparting rotary motion to said drum, the hinged frame-section over the upper front portion of said drum, said frame-section being capable of being raised and lowered, combined with means for feeding the tobacco-leaves to said cylinder or drum, means for removing the stems from said leaves during the inward travel of the latter to said drum, the endless belts passing around said drum and thence in reverse direction over suitable pulleys constituting a part of the said main frame, and means for actuating said belts; substantially as set forth.

15. In a tobacco-stripping machine, a support for the leaf, said support having the opening or slot for the stem of the leaf, the knives at said slot to sever the stem from the leaf, and means for feeding the leaf over said support, combined with the presser-wheel for pressing the stem of the leaf to the said knives, the hinged frame supporting said presser-wheel, means for adjusting said frame so as to regulate the pressure of said wheel upon the stem of the leaf, and gearing intermediate said wheel and the main driving-shaft for rotating said wheel; substantially as set forth.

16. In a tobacco-stripping machine, a support for the leaf, said support having the opening or slot for the stem of the leaf, combined with the knives at said slot to sever the stem from the leaf, means for feeding the leaf over said support, the presser-wheel for engaging the stem of the leaf to press said stem to said knives, the shaft carrying said wheel, the hinged frame carrying said shaft and wheel, the adjusting-finger carried by said frame for regulating the relation of said presser-wheel to said knives, and the driven wheel in engagement with said finger for maintaining the position of said presser-wheel; substantially as set forth.

17. In a tobacco-stripping machine, a support for the leaf, said support having the opening or slot for the stem of the leaf, means for feeding the leaf over said support, and the knives at said slot to sever the stem from the leaf, combined with the presser device for pressing the stem of the leaf to the said knives, the hinged frame supporting said presser device, and the driven wheel 110 for engaging said frame and maintaining the position of said presser device; substantially as set forth.

18. In a tobacco-stripping machine, a support for the leaf, said support having the opening or slot for the stem of the leaf, the knives at said slot to sever the stem from the leaf, and a presser device for pressing the stem of the leaf to said knives, combined with the hinged frame supporting said presser device, and the driven wheel, 110, engaging said frame for maintaining the position of said presser device, said wheel comprising the recessed rim 112 and recessed cam-section 111, the latter being capable of adjustment with respect to said wheel to vary the extent of the tallying portions of said rim and cam-section; substantially as set forth.

19. In a tobacco-stripping machine, a support for the leaf, said support having the opening or slot for the stem of the leaf, means for feeding the leaf over said support, and the knives horizontally disposed at said slot and below said support, combined with means for pressing the stem of the leaf into said slot and to said knives, means below the cutting edges of said knives for conducting away the stems of the leaves, and means above said knives for carrying away the stripped leaves; substantially as set forth.

Signed at New York, in the county of New York and State of New York, this 12th day of May, A. D. 1900.

JOHN R. WILLIAMS.

Witnesses:
 CHARLES C. GILL,
 GUNDER GUNDERSON.